Figures 1, 2, 3:
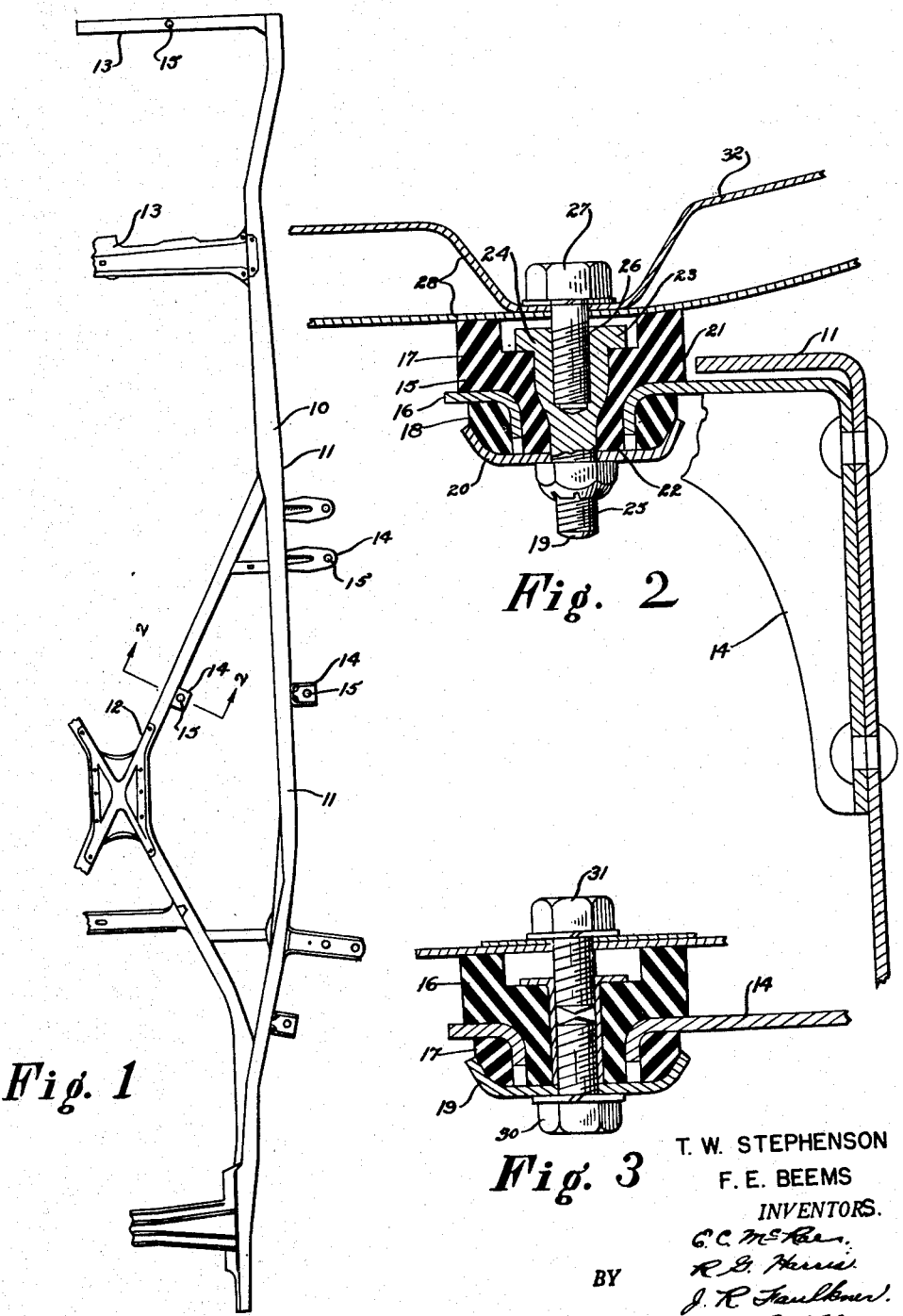

July 11, 1950     T. W. STEPHENSON ET AL     2,514,811

RESILIENT MOUNT

Filed Aug. 28, 1946

T. W. STEPHENSON
F. E. BEEMS
INVENTORS.

BY

ATTORNEYS.

Patented July 11, 1950

2,514,811

UNITED STATES PATENT OFFICE 2,514,811

RESILIENT MOUNT

Thomas W. Stephenson, Detroit, and Floyd E. Beems, Dearborn, Mich., assignors to Ford Motor Company, Dearborn, Mich., a corporation of Delaware Application August 28, 1946, Serial No. 693,398

1 Claim. (Cl. 248—9)

This invention relates to resilient mountings and more particularly to resilent pads or separators to eliminate noise and vibrations between two relatively movable objects such as in the mounting of automobile bodies to their chassis, a large motor to its base, and the like.

In the past, separation of two articles to lessen either noise or vibrations from one to the other was accomplished by means of small pads of rubber or other sound or vibration absorbing material. These pads were positioned manually during the assembling operations or were adhered to one of the articles and thereby held in place until final assembly. The above methods were satisfactory where the separator or pads were substantially flat having considerable adhering area as compared to their height and when the transmission of noise was not a factor.

However, in large assemblies such as automobile bodies to chassis and large motors to frames, the separators to perform efficiently must be of considerable thickness and have an elasticity factor to support the weight of the assembly without too great a deflection while providing the necessary functions. Therefore, positioning manually during assembly or preadhering of resilient separators or mountings to one of the components presents several problems. Manual positioning of each separator is overly expensive, requiring the efforts of several men to place the spacers while maneuvering the body into position. Preadhering the spacers into position prior to final assembly is not entirely satisfactory since many operations occur on the frame thereby scuffing and accidentally removing the separators before they are used.

In the manual placement of separators during final assembly, the following procedure had to be followed. The worker had to place and align the spacer as the two subassemblies were being positioned; bolts had to be threaded through the subassemblies and separators, this requiring the use of both hands, and finally tightening the bolts, usually with a speed wrench—this also requiring the use of both hands. It is therefore seen that if anchoring takes place at a point where one person's arms cannot encompass the work, two men must work as a team at each point of anchoring.

Moreover, the usual type of noise eliminators were merely spacers between two objects. The bolts extending through the objects to be fastened and through the spacer are in direct contact with both objects so that noise is transmitted through the bolt from one object to the other.

Now referring to Figure 1, frame 10 is a conventional automobile frame having channel sides 11, cross member 12 and transverse members 13. Various brackets 14 on which the body is supported are attached to the channel 11 by riveting or welding. To brackets 14 and to cross members 13, noise and vibration insulators or pucks 15 are mounted at any time prior to final assembly of body 32 to frame 10.

In Figure 2, a portion of an automobile body 32 is shown is cross section to illustrate the completed anchorage of the body to bracket 14 taken on line 2—2. Bracket 14 is riveted to and extends beyond channel 11. The mounting 15 is positioned on bracket 14 through the pierced and extruded flange 16. Other positions on frame 10 to which the body is fastened are also extruded as flange 16.

The resilient mounting 15 consists of annular members or pucks 17 and 18, bolt 19 and washer 20. The annular members 17 and 18 may be formed of rubber, fiber, plastics or other like materials. The annular member 17 is molded, having a shoulder 21 and neck 22 which passes through and extends beyond flange 16. Puck 17 also accommodates a T-shaped bolt 19 having a deeply shouldered head 23 and an intermediate portion 24 of greater diameter than the shank 25. Bolt 19 has also a threaded cavity 26 through its head 23 and in its intermediate portion 24 receives a second bolt 27 anchoring the body 28 to the mounting 15. Annular member 18 conforms to the outer dimension of the extruded flange 16 and also extends beneath the flange 16 approximately the same distance as annular member 17. Retaining washer 20 is a lipped washer tending to prevent the outward spreading of annular member 17. However, a flat washer will do as well if member 17 has a flat surface against which the washer abuts and is of a size to accommodate the loading.

On the final assembly line, the body mount 15 is placed on the frame 10 at any time prior to lowering of the body onto the frame. The mounts are easily and quickly installed by one man. Therefore, after the body has been placed on the frame, it will not require more than one man to work at each bolt, notwithstanding the location of the bolt.

Figure 3 illustrates a second adaptation in which bolt 19 is replaced by an internally threaded flanged nut or washer-nut 29. Washer-nut 29 is of such length that it will compress annular members 17 and 18 securely against flange 16 when drawn into contact with washer 20 by means of bolt 30. Bolt 31 is also threaded into washer-nut 29 fastening resiliently but securely a second article or body to flange 16. It is to be noticed that bolt 30 will not be loosened by the tightening of bolt 31. Also it is apparent that in the two adaptations there is no metal to metal contact between the body or other object to be insulated from noise and vibration while providing a resilient mounting.

Some changes may be made in the arrangement construction and combination of the various parts of the improved device without departing from the spirit of this invention and it is the intention to cover by the claim such changes as may be reasonably included within the scope thereof.

What is claimed is:

An antisqueak device and vibration dampener disposed between a supporting member and a supported member comprising a pair of annular elastomer members positioned about an extruded perforation in said supporting member, a flanged bolt, and a lipped washer, one of said elastomer members extending through and beyond the projection of said extruded perforation and having a depressed seat to receive said flanged bolt within the body of said member, the second of said elastomer members disposed about the extruded perforation and said lipped washer, said elastomer members separating the said supporting members and said lipped washer from metal-to-metal contact, and said flanged bolt having an internally threaded portion to which the supported member is attached.

THOMAS W. STEPHENSON.
FLOYD E. BEEMS.

REFERENCES CITED

The following references are of record in the file of this patent:

UNITED STATES PATENTS

| Number | Name | Date |
|---|---|---|
| 1,823,429 | Jansson | Sept. 15, 1931 |
| 1,833,424 | Jansson | Nov. 24, 1931 |